United States Patent
Mori et al.

(10) Patent No.: US 9,345,043 B2
(45) Date of Patent: May 17, 2016

(54) RADIO COMMUNICATION DEVICE AND RETRANSMISSION CONTROL METHOD

(71) Applicant: FUJITSU LIMITED, Kawasaki-shi, Kanagawa (JP)

(72) Inventors: Yasuhiro Mori, Fukuoka (JP); Shinji Shiramizu, Fukuoka (JP); Masahiko Ishizuka, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 63 days.

(21) Appl. No.: 14/258,717

(22) Filed: Apr. 22, 2014

(65) Prior Publication Data

US 2014/0321373 A1    Oct. 30, 2014

(30) Foreign Application Priority Data

Apr. 24, 2013   (JP) .................................. 2013-091712

(51) Int. Cl.
*H04W 72/04* (2009.01)
*H04W 72/12* (2009.01)

(52) U.S. Cl.
CPC ...... *H04W 72/1268* (2013.01); *H04W 72/1231* (2013.01)

(58) Field of Classification Search
CPC .................... H04W 72/1268; H04W 72/1231; H04W 72/1226; H04W 72/1205; H04W 72/12; H04W 72/1263; H04W 72/10; H04W 72/1252; H04W 72/1257
USPC .......................................... 370/310, 328, 329
See application file for complete search history.

(56) References Cited

U.S. PATENT DOCUMENTS

| | | | |
|---|---|---|---|
| 7,477,621 B1 * | 1/2009 | Loc et al. ...................... | 370/329 |
| 2006/0268821 A1 * | 11/2006 | Terry ............................. | 370/349 |
| 2009/0143046 A1 * | 6/2009 | Smith ......................... | 455/404.1 |
| 2010/0157895 A1 * | 6/2010 | Pani et al. ..................... | 370/328 |
| 2010/0273520 A1 * | 10/2010 | Pelletier et al. ............... | 455/522 |
| 2011/0081904 A1 | 4/2011 | Kuo | |
| 2011/0170495 A1 | 7/2011 | Earnshaw et al. | |
| 2011/0274023 A1 * | 11/2011 | Roh et al. ...................... | 370/311 |
| 2011/0292826 A1 * | 12/2011 | Ahn et al. ..................... | 370/252 |
| 2012/0033619 A1 * | 2/2012 | Corral ........................... | 370/329 |
| 2012/0033682 A1 * | 2/2012 | Corral ........................... | 370/476 |
| 2012/0236712 A1 * | 9/2012 | Park et al. ..................... | 370/230 |
| 2013/0121216 A1 * | 5/2013 | Chen et al. .................... | 370/280 |
| 2013/0196677 A1 * | 8/2013 | Smith et al. ................. | 455/452.1 |
| 2013/0301609 A1 * | 11/2013 | Smith et al. .................. | 370/331 |
| 2014/0050093 A1 * | 2/2014 | Liu et al. ...................... | 370/235 |
| 2014/0241265 A1 * | 8/2014 | Pragada et al. ............... | 370/329 |

FOREIGN PATENT DOCUMENTS

JP    2011-082984 A    4/2011
JP    2011-142638 A    7/2011

* cited by examiner

*Primary Examiner* — Chi H Pham
*Assistant Examiner* — Robert Lopata
(74) *Attorney, Agent, or Firm* — Arent Fox LLP

(57) ABSTRACT

A radio communication device includes a memory, a processor coupled to the memory and configured to allocate data to be transmitted from a communication terminal, to a plurality of radio carriers for communication with the communication terminal, identify, when a total amount of the data allocated to the radio carriers exceeds a certain amount, a communication terminal that performs transmission of excess data, which corresponds to the difference between the total amount and the certain amount, using the radio carrier to which the excess data is allocated, and a radio communication device configured to transmit a repeat request to the identified communication terminal that the excess data is transmitted to the radio communication device again.

6 Claims, 15 Drawing Sheets

FIG. 3

| COMMUNICATION TERMINAL ID | TBS | | | | |
|---|---|---|---|---|---|
| | CC#1 | CC#2 | CC#3 | CC#4 | CC#5 |
| UE#A | 2,000byte | 2,000byte | 2,000byte | 2,000byte | 2,000byte |
| UE#B | 1,000byte | 1,000byte | 1,000byte | 1,000byte | 1,000byte |

FIG. 8

| COMMUNICATION TERMINAL ID | TBS/PRIORITY LEVEL | | | | |
|---|---|---|---|---|---|
| | CC#1 | CC#2 | CC#3 | CC#4 | CC#5 |
| UE#A | 2,000byte/1 | 2,000byte/2 | 2,000byte/1 | 2,000byte/2 | 2,000byte/1 |
| UE#B | 1,000byte/2 | 1,000byte/1 | 1,000byte/2 | 1,000byte/1 | 1,000byte/2 |

FIG. 12

| COMMUNICATION TERMINAL ID | TBS/NUMBER OF TIMES OF TRANSMISSION | | | | |
|---|---|---|---|---|---|
| | CC#1 | CC#2 | CC#3 | CC#4 | CC#5 |
| UE#A | 2,000byte/1 | 2,000byte/20 | 2,000byte/11 | 2,000byte/22 | 2,000byte/0 |
| UE#B | 1,000byte/10 | 1,000byte/10 | 1,000byte/12 | 1,000byte/11 | 1,000byte/1 |

RADIO COMMUNICATION DEVICE AND RETRANSMISSION CONTROL METHOD

CROSS-REFERENCE TO RELATED APPLICATION

This application is based upon and claims the benefit of priority of the prior Japanese Patent Application No. 2013-091712, filed on Apr. 24, 2013, the entire contents of which are incorporated herein by reference.

FIELD

The embodiments discussed herein are related to a radio communication device and a retransmission control method.

BACKGROUND

In Long Term Evolution-Advanced (LTE-A), as a technology by which data having a larger capacity is transmitted, carrier aggregation (CA: frequency aggregation) has been used. In the CA, a mobile station (UE) as a communication terminal and a base station (eNB) as a radio communication device perform transmission and reception of data using a plurality of LTE radio carriers each of which is called a component carrier (CC). The plurality of LTE radio carriers respectively belong to different frequency bands.

In addition, when data is transmitted and received from and to between the mobile station and the base station by the CA, data that are to be transmitted from the mobile station are allocated to the plurality of CCs that is used to perform communication between the base station and the mobile station by executing scheduling processing in the base station. For example, in the CA, a scheduler that belongs to a media access control (MAC) sub-layer from among communication protocol layers in the base station allocates data that are to be transmitted from the mobile station, to the plurality of CCs. In addition, the data allocated to each of the CCs is transferred to a radio link control (RLC) sub-layer that is a higher-level layer than the MAC sub-layer. In addition, in the RLC sub-layer, the data transferred from the MAC sub-layer are aggregated and output to a core network through a packet data convergence protocol (PDCP) sub-layer that is a higher-level layer than the RLC sub-layer. The related art is Japanese Laid-open Patent Publication No. 2011-142638.

SUMMARY

According to an aspect of the invention, a radio communication device includes a memory, a processor coupled to the memory and configured to allocate data to be transmitted from a communication terminal, to a plurality of radio carriers for communication with the communication terminal, identify, when a total amount of the data allocated to the radio carriers exceeds a certain amount, a communication terminal that performs transmission of excess data, which corresponds to the difference between the total amount and the certain amount, using the radio carrier to which the excess data is allocated, and a radio communication device configured to transmit a repeat request to the identified communication terminal that the excess data is transmitted to the radio communication device again.

According to an aspect of the invention, an apparatus includes

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of scheduling information that is held in a target terminal selection unit according to the first embodiment;

FIG. 8 is a diagram illustrating an example of scheduling information that is held in a target terminal selection unit according to the second embodiment;

FIG. 12 is a diagram illustrating an example of scheduling information that is held in a target terminal selection unit according to the third embodiment;

DESCRIPTION OF EMBODIMENTS

However, in the related art, there is a loss of data which occurs at the time of communication using a plurality of radio carriers.

That is, in the CA of the related art, when a total amount of data allocated to the plurality of CCs by the scheduling processing exceeds an allowable amount that has been defined beforehand, data that has exceeded the allowable amount is discarded. For example, in the RLC sub-layer from among the communication protocol layers in the base station, when a total amount of data that are transferred from the MAC sub-layer exceeds an allowable amount that has been defined related to the RLC sub-layer, data that has exceeded the allowable amount is discarded. Therefore, in the CA of the related art, there is a problem that loss of data occurs at the time of communication using the plurality of CCs.

The discussed technology has been made by considering the above-mentioned, and an object of the discussed technology is to provide a radio communication device and a retransmission control method by which loss of data at the time of communication using a plurality of radio carriers is reduced.

The embodiments of the radio communication device and the retransmission control method discussed herein are described in detail below with reference to drawings. The discussed information is not limited to the embodiments.

First Embodiment

Figure 1:
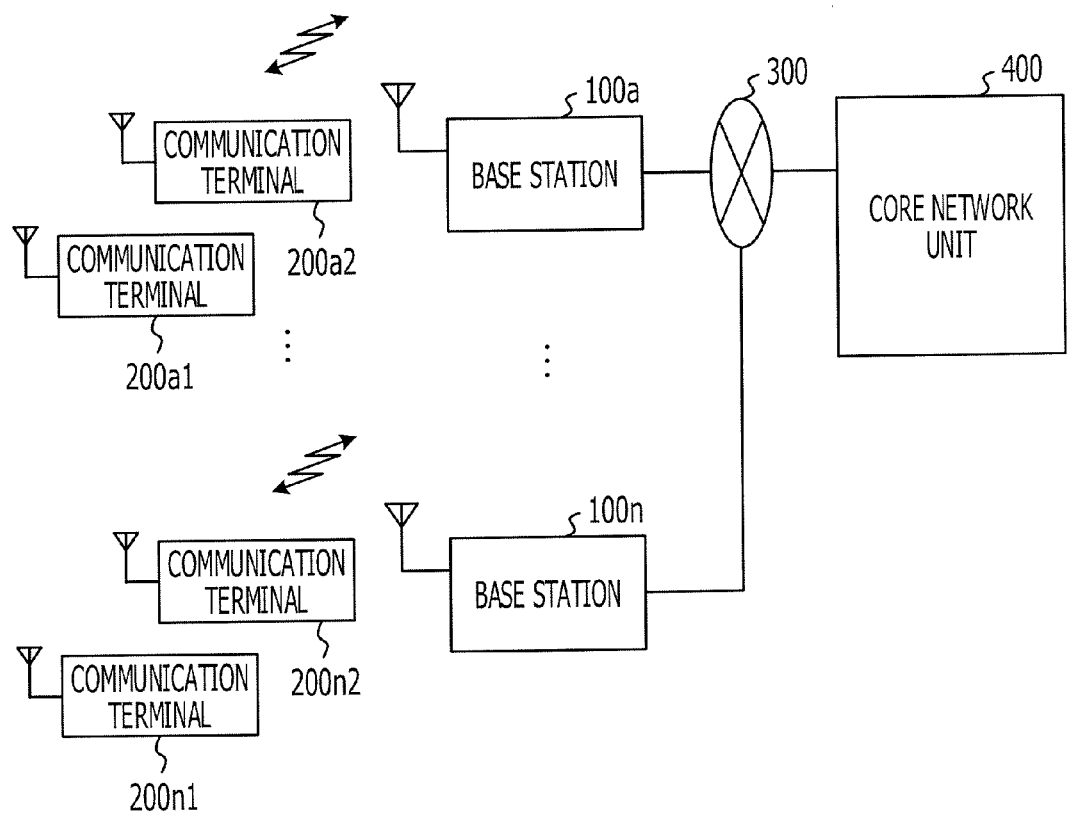
FIG. 1 is a diagram illustrating a configuration example of a radio communication system that includes a base station according to a first embodiment.

FIG. 1 is a diagram illustrating a configuration example of a radio communication system that includes a base station according to a first embodiment. The radio communication system illustrated in FIG. 1 includes base stations 100*a* to 100*n*, communication terminals 200*a*1, 200*a*2, . . . , 200*n*1, and 200*n*2, a line switching network 300, and a core network unit 400.

The base stations 100*a* to 100*n* are radio communication devices that perform communication with the communication terminals 200*a*1, 200*a*2, . . . , 200*n*1, and 200*n*2. Hereinafter, the base stations 100*a* to 100*n* are collectively referred to as "base station 100" as appropriate unless otherwise distinguished.

The communication terminals 200*a*1, 200*a*2, . . . , 200*n*1, 200*n*2 transmit and receive various data such as audio data and packet data to and from the core network unit 400 through the line switching network 300, using the radio communication with the base stations 100. The communication terminals 200*a*1, 200*a*2, . . . , 200*n*1, and 200*n*2 are collectively referred to as "communication terminal 200" as appropriate unless otherwise distinguished.

The core network unit 400 is, for example, an internet network, and provides various services in response to requests from the communication terminal 200.

The base stations 100 according to the embodiment allocates data that are to be transmitted from the communication terminals 200, to a plurality of CCs that are used to perform radio communication with the communication terminal 200. In addition, when a total amount of the data allocated to the plurality of CCs exceeds an allowable amount that has been defined beforehand, the base station 100 identifies the communication terminal 200 that performs transmission of data that has exceeded the allowable amount (hereinafter referred to as "excess data") using the CC to which the excess data is allocated. In addition, the base station 100 transmits a repeat request to the identified communication terminal 200 so that the excess data is transmitted to the base station 100 again.

Therefore, even when excess data occurs, the base station 100 according to the embodiment causes the communication terminal 200 to transmit the excess data again. As a result, in the base station 100 according to the embodiment, loss of data at the time of communication using the plurality of CCs may be reduced.

Figure 2:
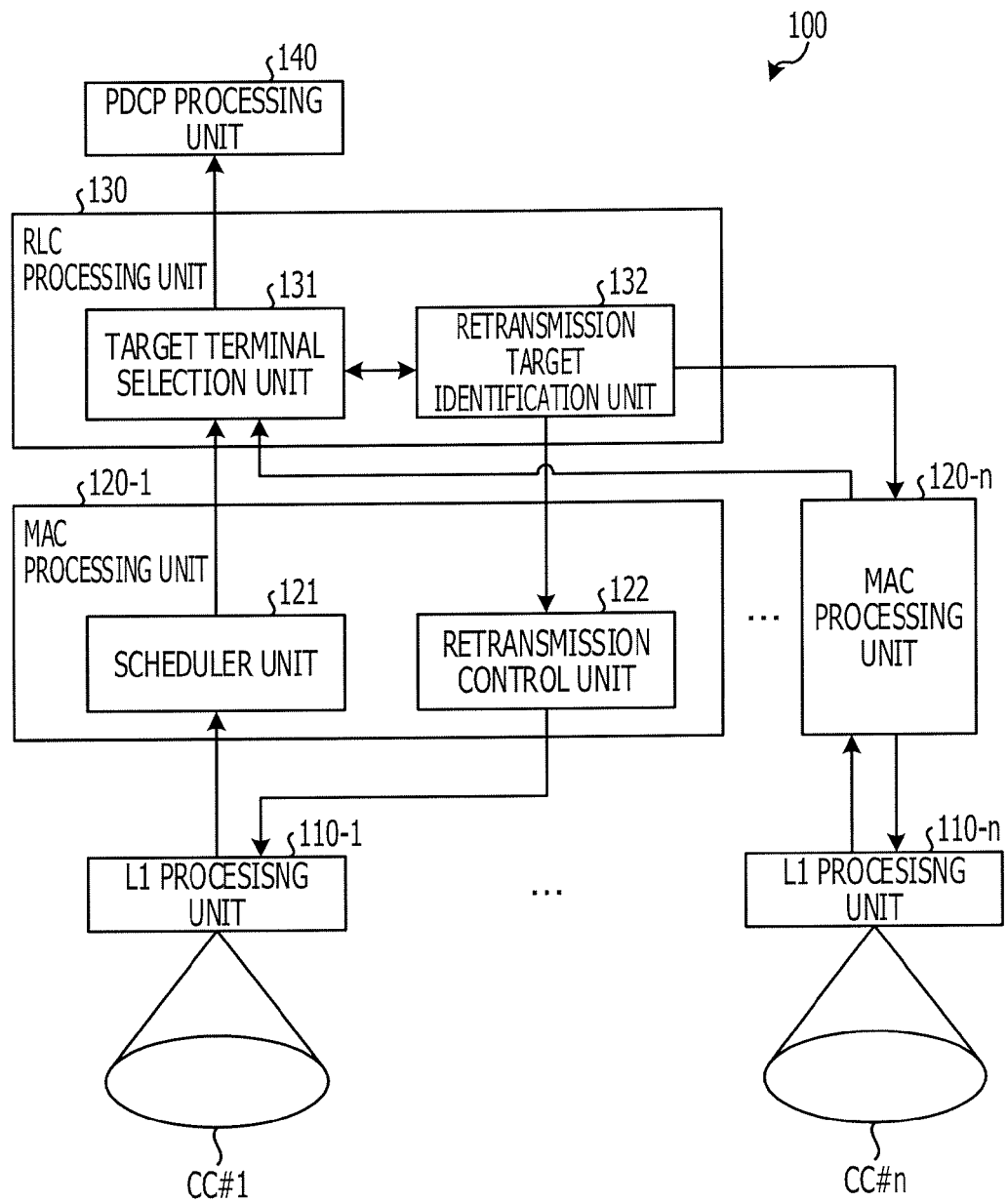
FIG. 2 is a block diagram illustrating the detailed configuration of the base station according to the first embodiment.

The detailed configuration of the base station 100 according to the first embodiment is described below. FIG. 2 is a block diagram illustrating the detailed configuration of the base station according to the first embodiment. As illustrated in FIG. 2, the base station 100 includes layer 1 (L1) processing units 110-1 to 110-*n* (n is a natural number of 1 or more), MAC processing units 120-1 to 120-*n*, an RLC processing unit 130, and a PDCP processing unit 140. The MAC processing units 120-1 to 120-*n*, the RLC processing unit 130, and the PDCP processing unit 140 respectively correspond to a MAC sub-layer, an RLC sub-layer, and a PDCP sub-layer in a layer 2 (L2).

The L1 processing units 110-1 to 110-*n* perform radio communication with the communication terminal 200 using CCs #1 to #n, respectively. For example, the L1 processing units 110-1 to 110-*n* receive data from the communication terminal 200 using the CCs #1 to #n, and respectively output the received data to the corresponding MAC processing units 120-1 to 120-*n*. In addition, for example, when a repeat request is input from one of the MAC processing units 120-1 to 120-*n*, corresponding one of the L1 processing units 110-1 to 110-*n* transmits the input repeat request to the communication terminal 200.

The MAC processing units 120-1 to 120-*n* transfer the data that are transmitted from the L1 processing units 110-1 to 110-*n*, to the RLC processing unit 130. Each of the MAC processing units 120-1 to 120-*n* includes a scheduler unit 121 and a retransmission control unit 122.

The scheduler unit 121 allocates data that are to be transmitted from the communication terminal 200, to the plurality of CCs that are used to perform communication with the communication terminal 200. The scheduler unit 121 is an example of an allocation unit. For example, it is assumed that the communication terminal 200 the identification information of which is "UE#A" and the communication terminal 200 the identification information of which is "UE#B" perform communication with the base station 100 using the CCs #1 to #5. In this case, the scheduler unit 121 allocates, to the CC#1, data of "2000 bytes" that is to be transmitted from the communication terminal 200 the identification information of which is "UE#A" by executing scheduling processing. In addition, for example, the scheduler unit 121 allocates, to the CC#1, data of "1000 bytes" that is to be transmitted from the communication terminal 200 the identification information of which is "UE#B" by the executing the scheduling processing. In addition, the scheduler unit 121 outputs, as a scheduling result, information that indicates data that has been allocated to each of the plurality of CCs, to a target terminal selection unit 131 in the RLC processing unit 130, which is described later.

The retransmission control unit 122 transmits a repeat request to the communication terminal 200 that is a retransmission target that is identified by a retransmission target identification unit 132 in the RLC processing unit 130, which is described later so that the excess data is transmitted to the base station 100 again. In addition, the retransmission control unit 122 transmits the repeat request to the communication terminal 200 that is the retransmission target, and terminates transfer of data from the MAC processing units 120-1 to 120-*n* to the RLC processing unit 130.

The RLC processing unit 130 aggregates the data that are transferred from the MAC processing units 120-1 to 120-*n* and outputs the aggregated data to the PDCP processing unit 140. The RLC processing unit 130 includes the target terminal selection unit 131 and the retransmission target identification unit 132.

When a total amount of the data allocated to the CCs exceeds an allowable amount that has been defined beforehand, the target terminal selection unit 131 sequentially selects a target terminal that is the communication terminal 200 that is a reception target of data, from the plurality of communication terminals 200 that performs communication with the base station 100 using each of the CCs. For example, the target terminal selection unit 131 accepts an input of a scheduling result from the scheduler unit 121 in each of the MAC processing units 120-1 to 120-*n* before the target terminal selection unit 131 receives data. The target terminal selection unit 131 obtains scheduling information by aggregating the accepted scheduling results, and holds the obtained scheduling information. The target terminal selection unit 131 determines, based on the scheduling information, whether or not a total amount of the data allocated to the CCs exceeds the allowable amount that has been defined beforehand. The allowable amount is defined, for example, depending on a processing capacity of the RLC processing unit 130. Hereinafter, an allowable amount that has been defined depending on a processing capacity in the RLC processing unit 130 beforehand is referred to as "predetermined allowable amount" as appropriate. In addition, the target terminal selection unit 131 sequentially selects a CC by a round-robin fashion when the total amount of the data allocated to the CCs exceeds the allowable amount, and sequentially selects a target terminal from the plurality of communication terminals 200 that performs communication with the base station 100 using the selected CC. At that time, the target terminal selection unit 131 successively reports information on the sequentially-selected target terminal, to the retransmission target identification unit 132.

In addition, when the total amount of the data allocated to the CCs is equal to the allowable amount or less, the target terminal selection unit 131 aggregates the data that are transferred from the MAC processing units 120-1 to 120-n and transfers the aggregated data to the PDCP processing unit 140.

When the total amount of the data allocated to the CCs exceeds the allowable amount, the retransmission target identification unit 132 identifies a communication terminal that performs transmission of excess data using the CC to which the excess data is allocated, as a communication terminal that is a retransmission target. For example, the retransmission target identification unit 132 successively accepts an input of information on the target terminal that is sequentially selected by the target terminal selection unit 131. The retransmission target identification unit 132 calculates a total amount of the data allocated to the communication terminals 200 that have been selected as the target terminals, with reference to the scheduling information that is held in the retransmission target identification unit 132. The retransmission target identification unit 132 monitors whether or not the calculated total amount of the data reaches the allowable amount. When the calculated total amount of the data reaches the allowable amount, the retransmission target identification unit 132 identifies the communication terminal 200 that is not selected by the target terminal selection unit 131 yet, as a communication terminal that performs transmission of the excess data. The retransmission target identification unit 132 notifies the retransmission control units 122 in the MAC processing units 120-1 to 120-n of the identified communication terminal 200 as the retransmission target.

The PDCP processing unit 140 transmits data that is transferred from the target terminal selection unit 131 in the RLC processing unit 130, to the core network unit 400 through the line switching network 300.

Figure 4:
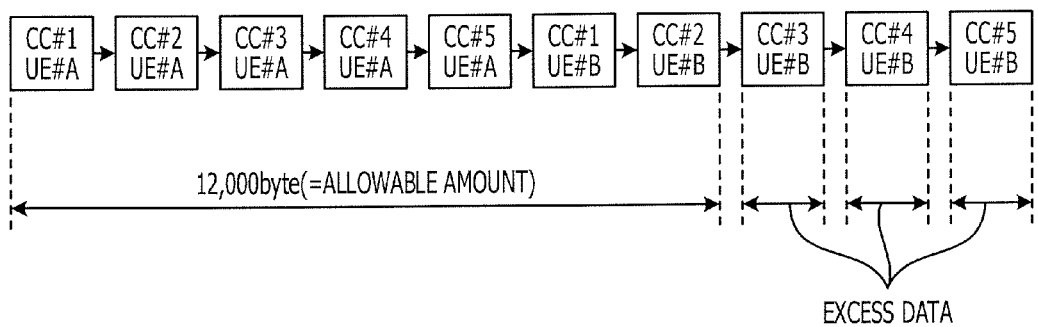
FIG. 4 is a diagram illustrating an example of processing by the target terminal selection unit and a retransmission target identification unit according to the first embodiment.

An example of processing by the target terminal selection unit 131 and the retransmission target identification unit 132 is described below. FIG. 3 is a diagram illustrating an example of scheduling information that is held in the target terminal selection unit according to the first embodiment. FIG. 4 is a diagram illustrating an example of processing by the target terminal selection unit and the retransmission target identification unit according to the first embodiment.

In the scheduling information illustrated in FIG. 3, a communication terminal ID is associated with a transport block size (TBS) and the associated communication terminal ID and TBS are stored. The communication terminal ID is identification information that uniquely identifies the communication terminal 200 that communicates with the base station 100 using the plurality of CCs. The TBS is the size of data that is allocated to each of the plurality of CCs that is used to perform communication with the communication terminal 200 that is identified by the communication terminal ID.

In FIG. 3, the first line indicates that the communication terminal 200 the identification information of which is "UE#A" performs communication with the base station 100 using the CCs #1 to #5, and that data of "2000 bytes" is allocated to each of the CCs #1 to #5. In addition, in FIG. 3, the second line indicates that the communication terminal 200 the identification information of which is "UE#B" performs communication with the base station 100 using the CCs #1 to #5, and that data of "1000 bytes" is allocated to each of the CCs #1 to #5.

The target terminal selection unit 131 accepts an input of a scheduling result from the scheduler unit 121 in each of the MAC processing units 120-1 to 120-n. The target terminal selection unit 131 obtains the scheduling information illustrated in FIG. 3 by aggregating the accepted scheduling results, and holds the obtained scheduling information. The target terminal selection unit 131 determines, based on the scheduling information, whether or not a total amount of data allocated to the CCs #1 to #5 exceeds a predetermined allowable amount. Here, it is assumed that the allowable amount is "12,000 bytes". The target terminal selection unit 131 executes the flowing processing because the total amount of the data allocated to the CCs #1 to #5 (15,000 bytes) exceeds the allowable amount (12,000 bytes). That is, the target terminal selection unit 131 sequentially selects each of the CCs #1 to #5 by the round-robin fashion and sequentially selects a target terminal from the plurality of communication terminals 200 that performs communication using the selected CC.

For example, as illustrated in FIG. 4, the target terminal selection unit 131 sequentially selects each of the CCs #1 to #5 in order of the CC#1, the CC#2, the CC#3, the CC#4, the CC#5, the CC#1, to the CC#2. In addition, the target terminal selection unit 131 selects, as a target terminal, the communication terminal 200 the identification information of which is "UE#A", from the communication terminal 200 the identification information of which is "UE#A" and the communication terminal 200 the identification information of which is "UE#B" that perform communication using the selected CC#1. Then, the target terminal selection unit 131 selects, as a target terminal, the communication terminal 200 the identification information of which is "UE#A" from the communication terminal 200 the identification information of which is "UE#A" and the communication terminal 200 the identification information of which is "UE#B" that perform communication using the CC#2. Then, the target terminal selection unit 131 selects, as a target terminal, the communication terminal 200 the identification information of which is "UE#A" from the communication terminal 200 the identification information of which is "UE#A" and the communication terminal 200 the identification information of which is "UE#B" that perform communication using the CC#3. Then, the target terminal selection unit 131 selects, as a target terminal, the communication terminal 200 the identification information of which is "UE#A" from the communication terminal 200 the identification information of which is "UE#A" and the communication terminal 200 the identification information of which is "UE#B" that perform communication using the CC#4. Then, the target terminal selection unit 131 selects, as a target terminal, the communication terminal 200 the identification information of which is "UE#A" from the communication terminal 200 the identification information of which is "UE#A" and the communication terminal 200 the identification information of which is "UE#B" that perform communication using the CC#5. In addition, the target terminal selection unit 131 selects, as a target terminal, the communication terminal 200 the identification information of which is "UE#B" from the communication terminal 200 the identification information of which is "UE#A" and the communication terminal 200 the identification information of which is "UE#B" that perform communication using the CC#1. In addition, the target terminal selection unit 131 selects, as a target terminal, the communication terminal 200 the identification information of which is "UE#B" from the communication terminal 200 the identification information of which is "UE#A" and the communication terminal 200 the identification information of which is "UE#B" that perform communication using the CC#2.

The retransmission target identification unit 132 successively accepts an input of information on the target terminal that has been sequentially selected by the target terminal selection unit 131. The retransmission target identification unit 132 monitors whether or not the total amount of the data allocated to the communication terminals 200 that have been selected as the target terminals reaches the allowable amount (12,000 bytes) with reference to the scheduling information illustrated in FIG. 3. The retransmission target identification unit 132 executes the following processing because the total amount of the data allocated to the communication terminals 200 that have been selected as the target terminals reaches the allowable amount (12,000 bytes) when the communication terminal 200 the identification information of which is "UE#B" and that performs communication using the CC#2 is selected. That is, as illustrated in FIG. 4, the retransmission target identification unit 132 identifies, as a communication terminal that performs transmission of the excess data, the communication terminal 200 the identification information of which is "UE#B", that performs communication using the CCs #3 to #5, and that is not selected by the target terminal selection unit 131 yet. The retransmission target identification unit 132 notifies the retransmission control units 122 in the MAC processing units 120-1 to 120-n of the identified communication terminal 200 as a retransmission target.

As described above, the target terminal selection unit 131 and the retransmission target identification unit 132 select the communication terminal 200 based on each of the CCs by the round-robin fashion. As a result, the communication terminal 200 that performs transmission of excess data of the base station 100 may be identified easily.

Figure 5:
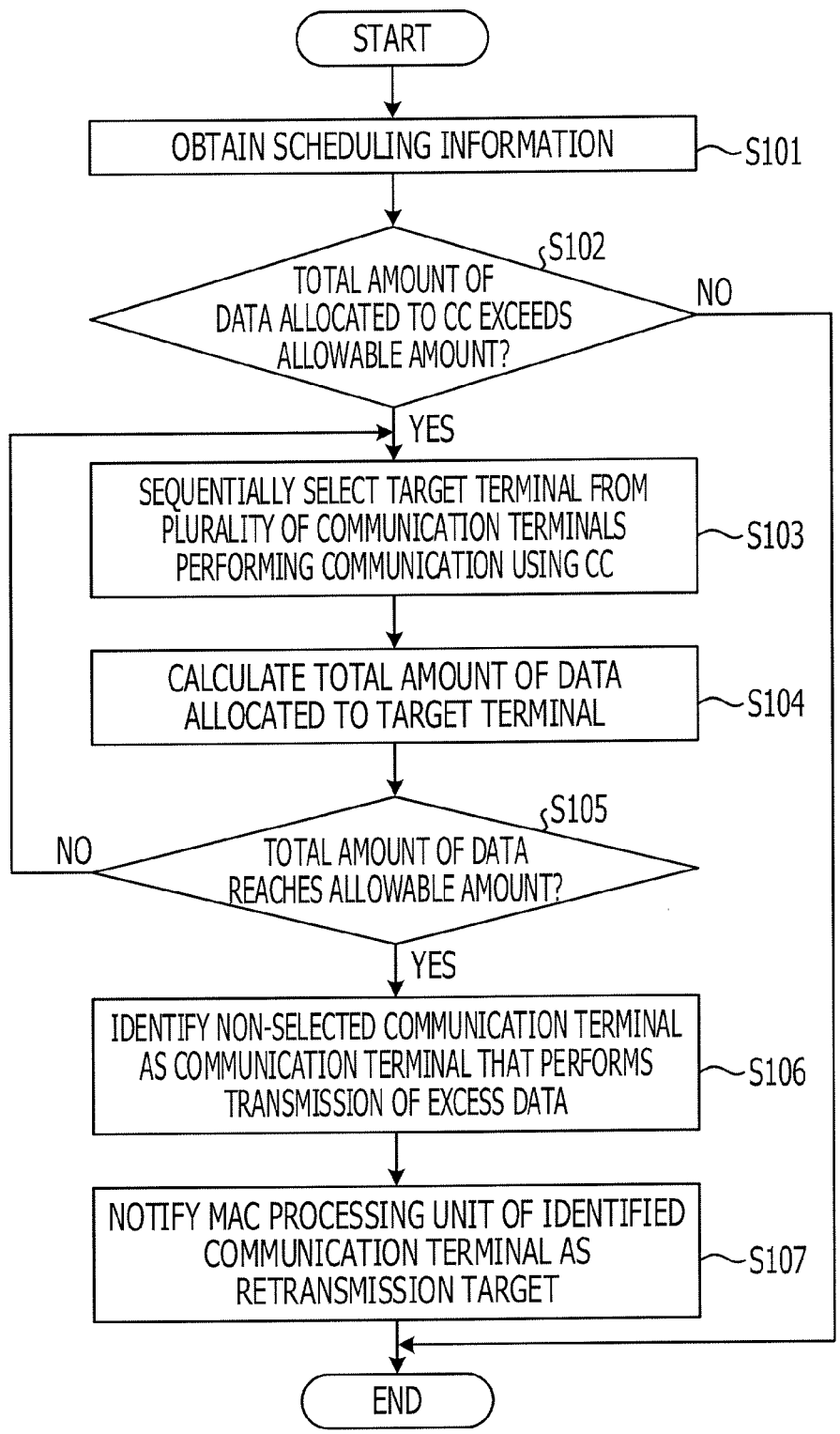
FIG. 5 is a flowchart illustrating a processing procedure by an RLC processing unit according to the first embodiment.

A processing procedure of a retransmission control method in the base station 100 according to the first embodiment is described below. FIG. 5 is a flowchart illustrating a processing procedure by the RLC processing unit according to the first embodiment.

As illustrated in FIG. 5, the target terminal selection unit 131 in the RLC processing unit 130 obtains scheduling information by aggregating the accepted scheduling results from the scheduler unit 121 in the MAC processing units 120-1 to 120-n (Step S101). The target terminal selection unit 131 holds the obtained scheduling information.

The target terminal selection unit 131 determines, based on the scheduling information, whether or not the total amount of the data allocated to the CCs exceeds an allowable amount (Step S102). When the total amount of the data allocated to the CCs is equal to the allowable amount or less (No in Step S102), the target terminal selection unit 131 aggregates the data that are transferred from the MAC processing units 120-1 to 120-n, transfers the aggregated piece of data to the PDCP processing unit 140, and ends the processing.

In addition, when the total amount of the data allocated to the CCs exceeds the allowable amount (Yes in Step S102), the target terminal selection unit 131 sequentially selects a target terminal from the plurality of communication terminals 200 that performs communication using each of the CCs (Step S103). At that time, the target terminal selection unit 131 successively reports information on the sequentially selected target terminal, to the retransmission target identification unit 132.

The retransmission target identification unit 132 successively accept an input of the information on the target terminal that has been sequentially selected by the target terminal selection unit 131. The retransmission target identification unit 132 calculates a total amount of the data allocated to the communication terminals 200 that have been selected as the target terminals, with reference to the scheduling information that is held in the target terminal selection unit 131 (Step S104).

The retransmission target identification unit 132 monitors whether or not the calculated total amount of the data reaches the allowable amount (Step S105). The retransmission target identification unit 132 returns the processing to Step S103 when the calculated total amount of the data is less than the allowable amount (No in Step S105).

In addition, when the calculated total amount of the data reaches the allowable amount (Yes in Step S105), the retransmission target identification unit 132 identifies the communication terminal 200 that is not selected by the target terminal selection unit 131 yet, as a communication terminal that performs transmission of the excess data (Step S106). The retransmission target identification unit 132 notifies the retransmission controls units 122 in the MAC processing units 120-1 to 120-n of the identified communication terminal 200 as the retransmission target (Step S107).

Figure 6:
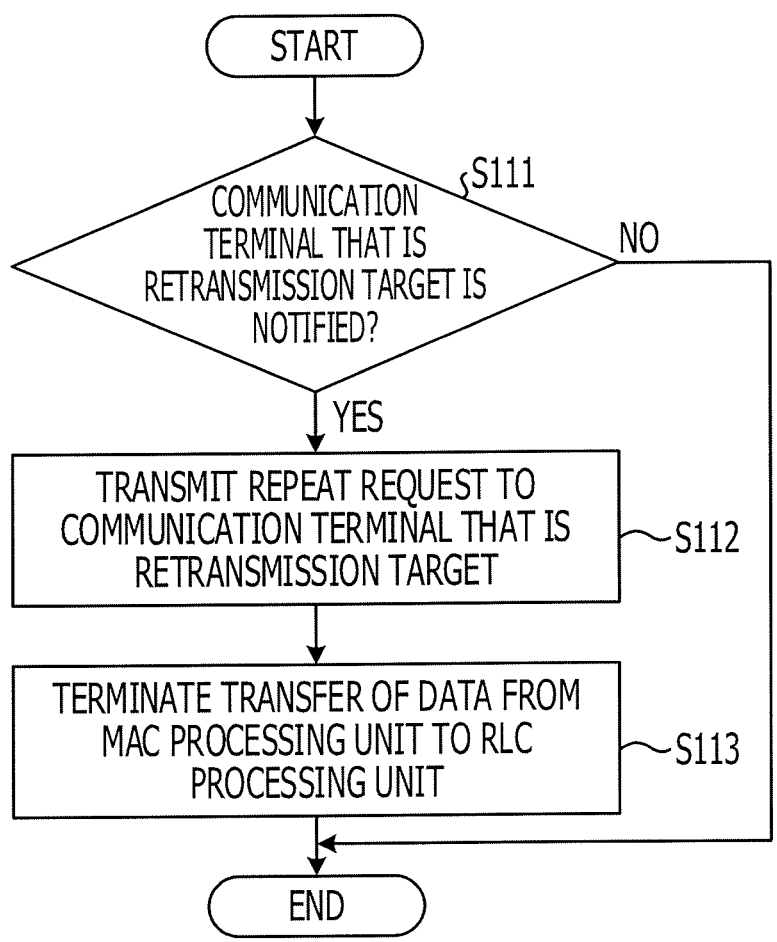
FIG. 6 is a flowchart illustrating a processing procedure by a MAC processing unit according to the first embodiment.

FIG. 6 is a flowchart illustrating a processing procedure by the MAC processing unit according to the first embodiment. As illustrated in FIG. 6, when the communication terminal 200 that is a retransmission target is not notified from the RLC processing unit 130 (No in Step S111), the retransmission control unit 122 in the MAC processing units 120-1 to 120-n ends the processing.

When the communication terminal 200 that is the retransmission target is notified from the RLC processing unit 130 (Yes in Step S111), the retransmission control unit 122 transmits a repeat request to the communication terminal 200 that is the retransmission target so that the excess data is transmitted to the base station 100 again (Step S112).

The retransmission control unit 122 transmits the repeat request to the communication terminal 200 that is the retransmission target, and terminates transfer of data from the MAC processing units 120-1 to 120-n to the RLC processing unit 130 (Step S113).

As described above, the base station 100 according to the first embodiment allocates data that are to be transmitted from the communication terminal 200, to the plurality of CCs that are used to perform radio communication with the communication terminal 200. In addition, when a total amount of the data allocated to the CCs exceeds a predetermined allowable amount, the base station 100 identifies the communication terminal 200 that performs transmission of the excess data using the CC to which the excess data is allocated. In addition, the base station 100 transmits a repeat request to the identified communication terminal 200 so that the excess data is transmitted to the base station 100 again.

Therefore, even when excess data occurs before communication using the plurality of CCs is performed, the base station 100 according to the first embodiment may cause the communication terminal 200 to perform transmission of the excess data. As a result, in the base station 100 according to the first embodiment, loss of data at the time of communication using the plurality of CCs may be reduced.

In addition, the base station 100 according to the first embodiment sequentially selects a target terminal from the plurality of communication terminals 200 that performs communication with the base station 100 using each of the CCs. In addition, when a total amount of data allocated to the sequentially selected target terminals reaches the allowable amount, the base station 100 identifies the communication terminal 200 that is not selected yet, as a communication terminal that performs transmission of the excess data.

Therefore, the base station 100 according to the first embodiment may select the communication terminal 200 based on each of the CCs by the round-robin fashion. As a result, the communication terminal 200 that performs transmission of excess data of the base station 100 may be identified easily, and loss of data at the time of communication using the plurality of CCs may be reduced appropriately.

Second Embodiment

In the above-described first embodiment, the example is described in which a certain communication terminal is selected as a target terminal based on each of the CCs by the round-robin fashion. However, when a target terminal is selected based on each of the CCs by the round-robin fashion, the target terminal may be selected in order of priority level. Therefore, in a second embodiment, an example is described in which a target terminal is selected in order of priority level when the target terminal is selected based on each of the CCs by the round-robin fashion. Hereinafter, the same reference numerals are assigned to configuration elements that are similar to the configuration elements according to the first embodiment, and the description is omitted.

Figure 7:
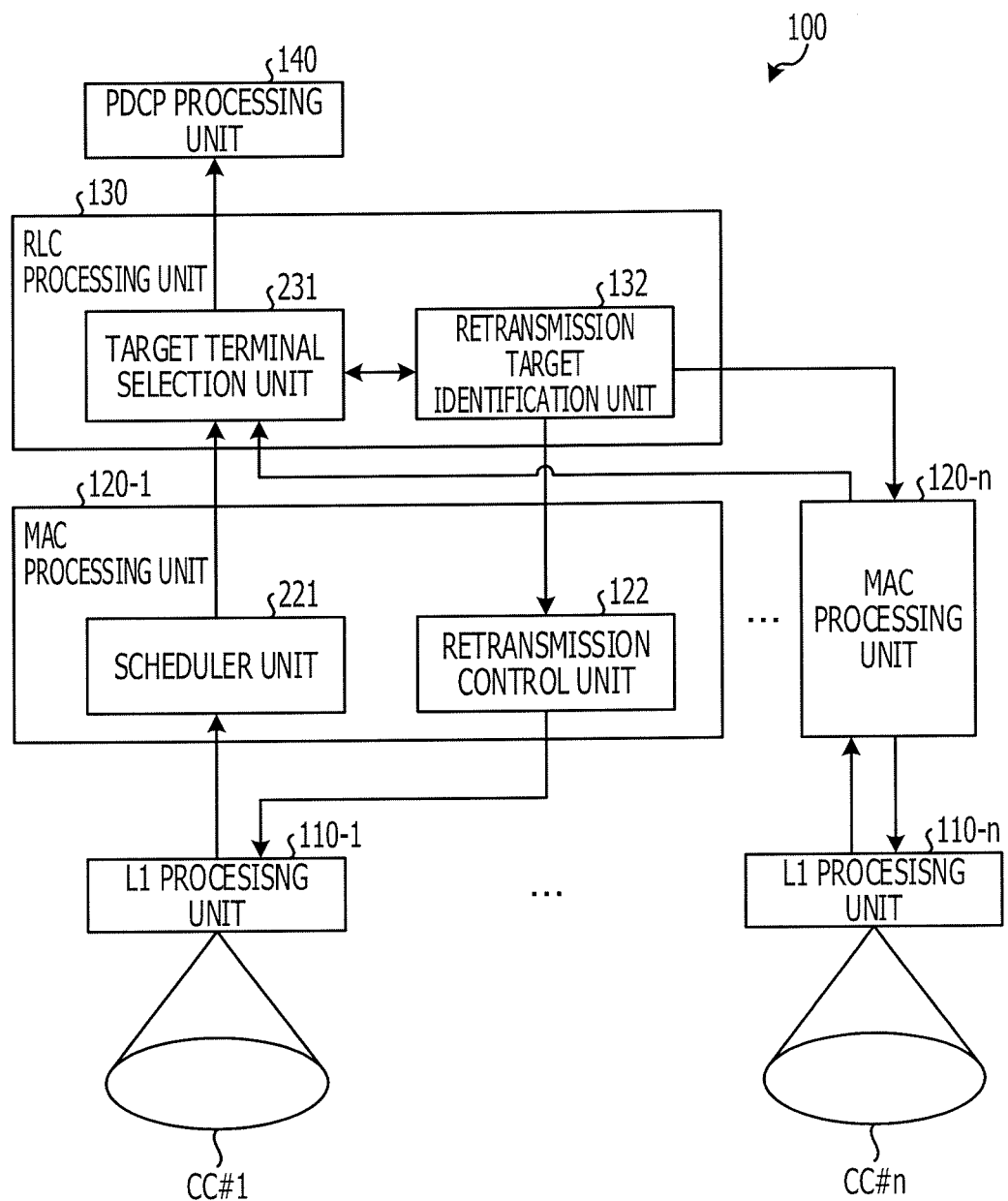
FIG. 7 is a block diagram illustrating the detailed configuration of a base station according to a second embodiment.

FIG. 7 is a block diagram illustrating the detailed configuration of a base station according to the second embodiment. As illustrated in FIG. 7, the base station 100 according to the second embodiment includes a scheduler unit 221 and a target terminal selection unit 231 instead of the scheduler unit 121 and the target terminal selection unit 131 illustrated in FIG. 2.

The scheduler unit 221 in the MAC processing units 120-1 to 120-n allocates, to each of the CCs, data that is to be transmitted from the communication terminal 200 and a priority level of the communication terminal 200 that performs transmission of the data. The priority level is set beforehand in accordance with information that indicates urgency in the data, and the like, and the value becomes small as the urgency becomes high. For example, a case is assumed in which the communication terminal 200 the identification information of which is "UE#A" and the communication terminal 200 the identification information of which is "UE#B" perform communication with the base station 100 using the CCs #1 to #5. In this case, the scheduler unit 221 allocates, to the CC#1, data of "2000 bytes" that is to be transmitted from the communication terminal 200 the identification information of which is "UE#A" and a priority level of the communication terminal 200 the identification information of which is "UE#A" by executing the scheduling processing. In addition, for example, the scheduler unit 221 allocates, to the CC#1, data of "1000 bytes" that is to be transmitted from the communication terminal 200 the identification information of which is "UE#B" and a priority level of the communication terminal 200 the identification information of which is "UE#B" by executing the scheduling processing. In addition, the scheduler unit 221 outputs, as a scheduling result, information that indicates the data and the priority level that are allocated to each of the plurality of CCs, to a target terminal selection unit 231 in the RLC processing unit 130, which is described later.

When a total amount of data allocated to the CCs exceeds a predetermined allowable amount, the target terminal selection unit 231 sequentially selects a target terminal in order of priority level, from the plurality of communication terminals 200 that performs communication with the base station 100 using each of the CCs. For example, the target terminal selection unit 231 accepts an input of a scheduling result from the scheduler unit 221 in each of the MAC processing units 120-1 to 120-n. The target terminal selection unit 231 obtains scheduling information by aggregating the accepted scheduling results and holds the obtained scheduling information. The target terminal selection unit 231 determines, based on the scheduling information, whether or not a total amount of the data allocated to the CCs exceeds a predetermined allowable amount. The allowable amount is defined depending on a processing capacity of the RLC processing unit 130. Hereinafter, an allowable amount that has been defined beforehand depending on a processing capacity of the RLC processing unit 130 is referred to as "predetermined allowable amount" as appropriate. In addition, the target terminal selection unit 231 executes the following processing when the total amount of the data allocated to the CCs exceeds the allowable amount. That is, the target terminal selection unit 231 sequentially selects each of the CCs by the round-robin fashion, and sequentially selects a target terminal in order of priority level from the plurality of communication terminals 200 that performs communication with the base station 100 using the selected CC. At that time, the target terminal selection unit 231 successively reports information on the sequentially selected target terminal, to the retransmission target identification unit 132.

When priority levels of the plurality of communication terminals 200 that performs communication with the base station 100 using the selected CC are same, the target terminal selection unit 231 selects a certain communication terminal from the plurality of communication terminals 200, as a target terminal.

Figure 9:
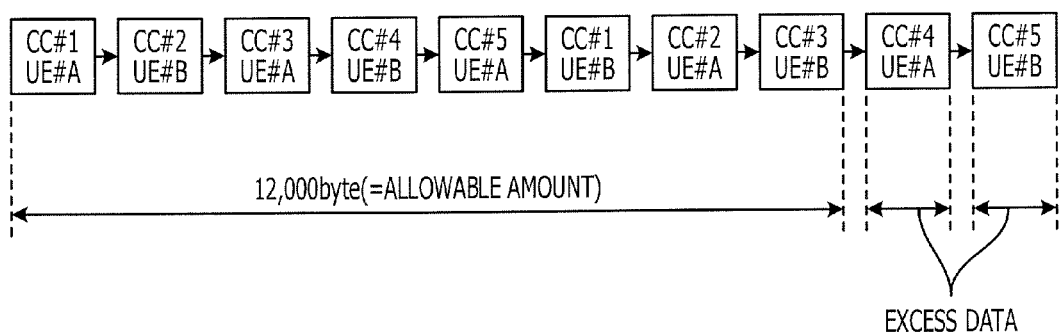
FIG. 9 is a diagram illustrating an example of processing by the target terminal selection unit and a retransmission target identification unit according to the second embodiment.

An example of processing by the target terminal selection unit 231 and the retransmission target identification unit 132 is described below. FIG. 8 is a diagram illustrating an example of scheduling information that is held in the target terminal selection unit according to the second embodiment. FIG. 9 is a diagram illustrating the example of processing by the target terminal selection unit and the retransmission target identification unit according to the second embodiment.

In the scheduling information illustrated in FIG. 8, a communication terminal ID is associated with "TBS/priority level" and the associated communication terminal ID and "TBS/priority level" are stored. The communication terminal ID is identification information that is used to uniquely identify the communication terminal 200 that performs communication with the base station 100 using the plurality of CCs. Here, "TBS/priority level" is a combination of the size of data that is allocated to each of the plurality of CCs that is used to perform communication with the communication terminal 200 that is identified by the communication terminal ID and the priority level of the communication terminal 200.

In FIG. 8, the first line indicates that the communication terminal 200 the identification information of which is "UE#A" performs communication with the base station 100 using the CCs #1 to #5, and that data of "2000 bytes" is allocated to each of the CCs #1 to #5. In addition, the first line in FIG. 8 indicates that the priority level of the communication terminal 200 the identification information of which is "UE#A" and that transmits data of "2000 bytes" using the CC#1 is "1". The first line in FIG. 8 indicates that the priority level of the communication terminal 200 the identification information of which is "UE#A" and that transmits data of "2000 bytes" using the CC#2 is "2". The first line in FIG. 8 indicates that the priority level of the communication terminal 200 the identification information of which is "UE#A" and that transmits data of "2000 bytes" using the CC#3 is "1". The first line in FIG. 8 indicates that the priority level of the communication terminal 200 the identification information of which is "UE#A" and that transmits data of "2000 bytes" using the CC#4 is "2". The first line in FIG. 8 indicates that the priority level of the communication terminal 200 the identification information of which is "UE#A" and that transmits data of "2000 bytes" using the CC#5 is "1".

In addition, in FIG. 8, the second line indicates that the communication terminal 200 the identification information of which is "UE#B" performs communication with the base station 100 using the CCs #1 to #5, and that data of "1000 bytes" is allocated to each of the CCs #1 to #5. In addition, the second line in FIG. 8 indicates that the priority level of the communication terminal 200 the identification information of which is "UE#B" and that transmits data of "1000 bytes" using the CC#1 is "2". The second line in FIG. 8 indicates that the priority level of the communication terminal 200 the identification information of which is "UE#B" and that transmits data of "1000 bytes" using the CC#2 is "1". The second line in FIG. 8 indicates that the priority level of the communication terminal 200 the identification information of which is "UE#B" and that transmits data of "1000 bytes" using the CC#3 is "2". The second line in FIG. 8 indicates that the priority level of the communication terminal 200 the identification information of which is "UE#B" and that transmits data of "1000 bytes" using the CC#4 is "1". The second line in FIG. 8 indicates that the priority level of the communication terminal 200 the identification information of which is "UE#B" and that transmits data of "1000 bytes" using the CC#5 is "2".

The target terminal selection unit 231 accepts an input of a scheduling result from the scheduler unit 221 in each of the MAC processing units 120-1 to 120-n. The target terminal selection unit 231 obtains the scheduling information illustrated in FIG. 8 by aggregating the accepted scheduling results and holds the obtained scheduling information. The target terminal selection unit 231 determines, based on the scheduling information, whether or not a total amount of the data allocated to the CCs #1 to #5 exceeds the predetermined allowable amount. Here, it is assumed that the allowable amount is 12,000 bytes. The target terminal selection unit 231 executes the following processing because the total amount of the data allocated to the CCs #1 to #5 (15,000 bytes) exceeds the allowable amount (12,000 bytes). That is, the target terminal selection unit 231 sequentially selects each of the CCs #1 to #5 by the round-robin fashion, and sequentially selects a target terminal in order of priority level from the plurality of communication terminals 200 that performs communication using the selected CC.

For example, as illustrated in FIG. 9, the target terminal selection unit 231 sequentially selects each of the CCs #1 to #5 in order of the CC#1, the CC#2, the CC#3, the CC#4, the CC#5, the CC#1, the CC#2, to the CC#3. In addition, the target terminal selection unit 231 selects, as a target terminal, the communication terminal 200 the identification information of which is "UE#A" and that has the highest priority level, from the communication terminal 200 the identification information of which is "UE#A" and the communication terminal 200 the identification information of which is "UE#B" that perform communication using the selected CC#1. Then, the target terminal selection unit 231 selects, as a target terminal, the communication terminal 200 the identification information of which is "UE#B" and that has the highest priority level, from the communication terminal 200 the identification information of which is "UE#A" and the communication terminal 200 the identification information of which is "UE#B" that perform communication using the CC#2. Then, the target terminal selection unit 231 selects, as a target terminal, the communication terminal 200 the identification information of which is "UE#A" and that has the highest priority level, from the communication terminal 200 the identification information of which is "UE#A" and the communication terminal 200 the identification information of which is "UE#B" that perform communication using the CC#3. Then, the target terminal selection unit 231 selects, as a target terminal, the communication terminal 200 the identification information of which is "UE#B" and that has the highest priority level, from the communication terminal 200 the identification information of which is "UE#A" and the communication terminal 200 the identification information of which is "UE#B" that perform communication using the CC#4. Then, the target terminal selection unit 231 selects, as a target terminal, the communication terminal 200 the identification information of which is "UE#A" and that has the highest priority level, from the communication terminal 200 the identification information of which is "UE#A" and the communication terminal 200 the identification information of which is "UE#B" that perform communication using the CC#5. In addition, the target terminal selection unit 231 selects, as a target terminal, the communication terminal 200 the identification information of which is "UE#B" and that has the second highest priority level, from the communication terminal 200 the identification information of which is "UE#A" and the communication terminal 200 the identification information of which is "UE#B" that perform communication using the CC#1. In addition, the target terminal selection unit 231 selects, as a target terminal, the communication terminal 200 the identification information of which is "UE#A" and that has the second highest priority level, from the communication terminal 200 the identification information of which is "UE#A" and the communication terminal 200 the identification information of which is "UE#B" that perform communication using the CC#2. In addition, the target terminal selection unit 231 selects, as a target terminal, the communication terminal 200 the identification information of which is "UE#B" and that has the second highest priority level, from the communication terminal 200 the identification information of which is "UE#A" and the communication terminal 200 the identification information of which is "UE#B" that perform communication using the CC#3.

The retransmission target identification unit 132 successively accepts an input of information on the target terminal that has been sequentially selected by the target terminal selection unit 231. The retransmission target identification unit 132 monitors whether or not a total amount of the data allocated to the communication terminals 200 that have been selected as the target terminals reaches the allowable amount (12,000 bytes), with reference to the scheduling information illustrated in FIG. 8. The retransmission target identification unit 132 executes the following processing because the total amount of the data allocated to the communication terminals 200 that have been selected as the target terminals reaches the allowable amount (12,000 bytes) when the communication terminal 200 the identification information of which is "UE#B" and that performs communication using the CC#3 is selected. That is, as illustrated in FIG. 9, the retransmission target identification unit 132 identifies the communication terminal 200 the identification information of which is "UE#A", that performs communication using the CC#4, and that is not selected by the target terminal selection unit 231, as a communication terminal that performs transmission of the excess data. In addition, the retransmission target identification unit 132 identifies the communication terminal 200 the identification information of which is "UE#B" and that performs communication using the CC#5, as a communication terminal that performs transmission of the excess data. The retransmission target identification unit 132 notifies the retransmission control units 122 in the MAC processing units 120-1 to 120-*n* of the identified communication terminal 200, as a retransmission target.

As described above, when a target terminal is selected based on each of the CCs by the round-robin fashion, the target terminal selection unit 231 and the retransmission target identification unit 132 select a target terminal in order of priority level. As a result, a communication terminal that is a reception target of data may be selected in order of priority level, and the communication terminal 200 that performs transmission of excess data of the base station 100 may be identified easily.

Figure 10:
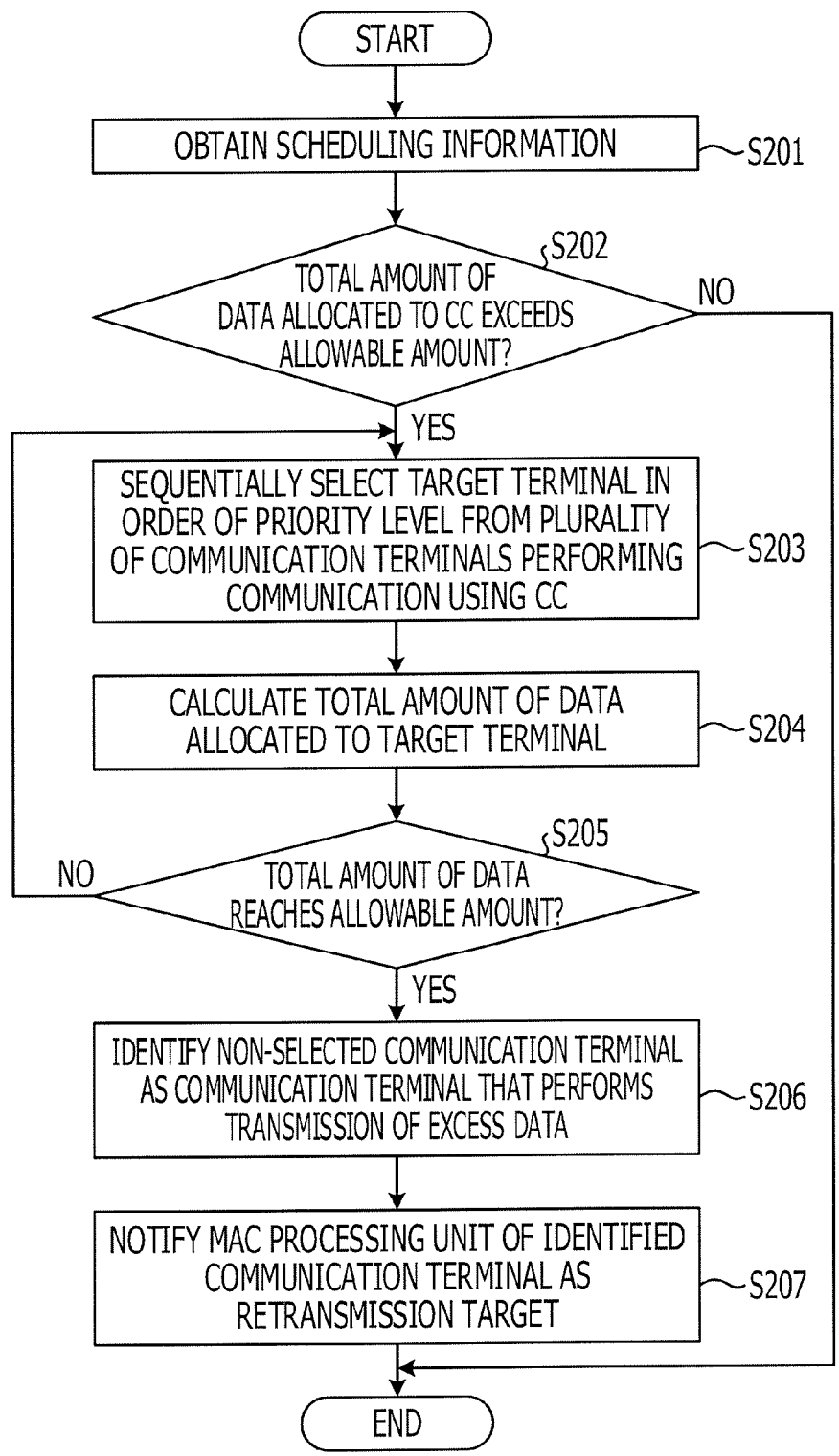
FIG. 10 is a flowchart illustrating a processing procedure by an RLC processing unit according to the second embodiment.

A processing procedure of the retransmission control method in the base station 100 according to the embodiment is described below. FIG. 10 is a flowchart illustrating a processing procedure by the RLC processing unit according to the second embodiment. A processing procedure in the MAC processing unit according to the second embodiment is similar to the processing procedure illustrated in FIG. 6, and the description is omitted herein.

As illustrated in FIG. 10, the target terminal selection unit 231 in the RLC processing unit 130 obtains scheduling information by aggregating the accepted scheduling results that have been accepted from the scheduler units 221 in the MAC processing units 120-1 to 120-*n* (Step S201). The target terminal selection unit 231 holds the obtained scheduling information.

The target terminal selection unit 231 determines, based on the scheduling information, whether or not a total amount of the data allocated to the CCs exceeds an allowable amount (Step S202). When the total amount of the data allocated to the CCs is equal to the allowable amount or less (No in Step S202), the target terminal selection unit 231 aggregates the data that are transferred from the MAC processing units 120-1 to 120-*n*, transfers the aggregated data, to the PDCP processing unit 140, and ends the processing.

In addition, when the total amount of the data allocated to the CCs exceeds the allowable amount (Yes in Step S202), the target terminal selection unit 231 sequentially selects a target terminal in order of priority level, from the plurality of communication terminals 200 that performs communication using each of the CCs (Step S203). At that time, the target terminal selection unit 231 successively reports information on the sequentially selected target terminal to the retransmission target identification unit 132.

The retransmission target identification unit 132 successively accepts an input of information on the target terminal that has been sequentially selected by the target terminal selection unit 231. The retransmission target identification unit 132 calculates a total amount of the data allocated to the communication terminals 200 that have been selected as the target terminals, with reference to the scheduling information that is held in the target terminal selection unit 231 (Step S204).

The retransmission target identification unit 132 monitors whether or not the calculated total amount of the data reaches the allowable amount (Step S205). When the calculated total amount of the data is less than the allowable amount (No in Step S205), the retransmission target identification unit 132 returns the processing to Step S203.

In addition, when the calculated total amount of the data reaches the allowable amount (Yes in Step S205), the retransmission target identification unit 132 identifies the communication terminal 200 that is not selected by the target terminal selection unit 231 yet, as a communication terminal that performs transmission of the excess data (Step S206). The retransmission target identification unit 132 notifies the retransmission control units 122 in the MAC processing units 120-1 to 120-*n* of the identified communication terminal 200, as a retransmission target (Step S207).

As described above, the base station 100 according to the second embodiment sequentially selects a target terminal in order of priority level, from the plurality of communication terminals 200 that performs communication with the base station 100 using each of the CCs. In addition, when a total amount of data allocated to the sequentially selected target terminals reaches the allowable amount, the base station 100 identifies the communication terminal 200 that is not selected yet, as a communication terminal that performs transmission of the excess data.

Therefore, when a target terminal is selected based on the each of the CCs by the round-robin fashion, the base station 100 according to the second embodiment may select a target terminal in order of priority level. Thus, a communication terminal that is a reception target of data is selected in order of priority level, and the communication terminal 200 that performs transmission of excess data of the base station 100 may be identified easily. As a result, loss of data having a high priority level from among data at the time of communication using the plurality of CCs may be reduced on a priority basis.

Third Embodiment

In the above-described first embodiment, the example is described in which a certain communication terminal is selected based on each of the CCs by the round-robin fashion as a target terminal. However, when a target terminal is selected based on each of the CCs by the round-robin fashion, the target terminal may be selected in order of communication quality. Therefore, in a third embodiment, an example is described in which a target terminal is selected in order of communication quality when the target terminal is selected based on each of the CCs by the round-robin fashion. The same reference numerals are assigned to configuration elements that are similar to the configuration elements according to the first embodiment, and the description is omitted herein.

Figure 11:
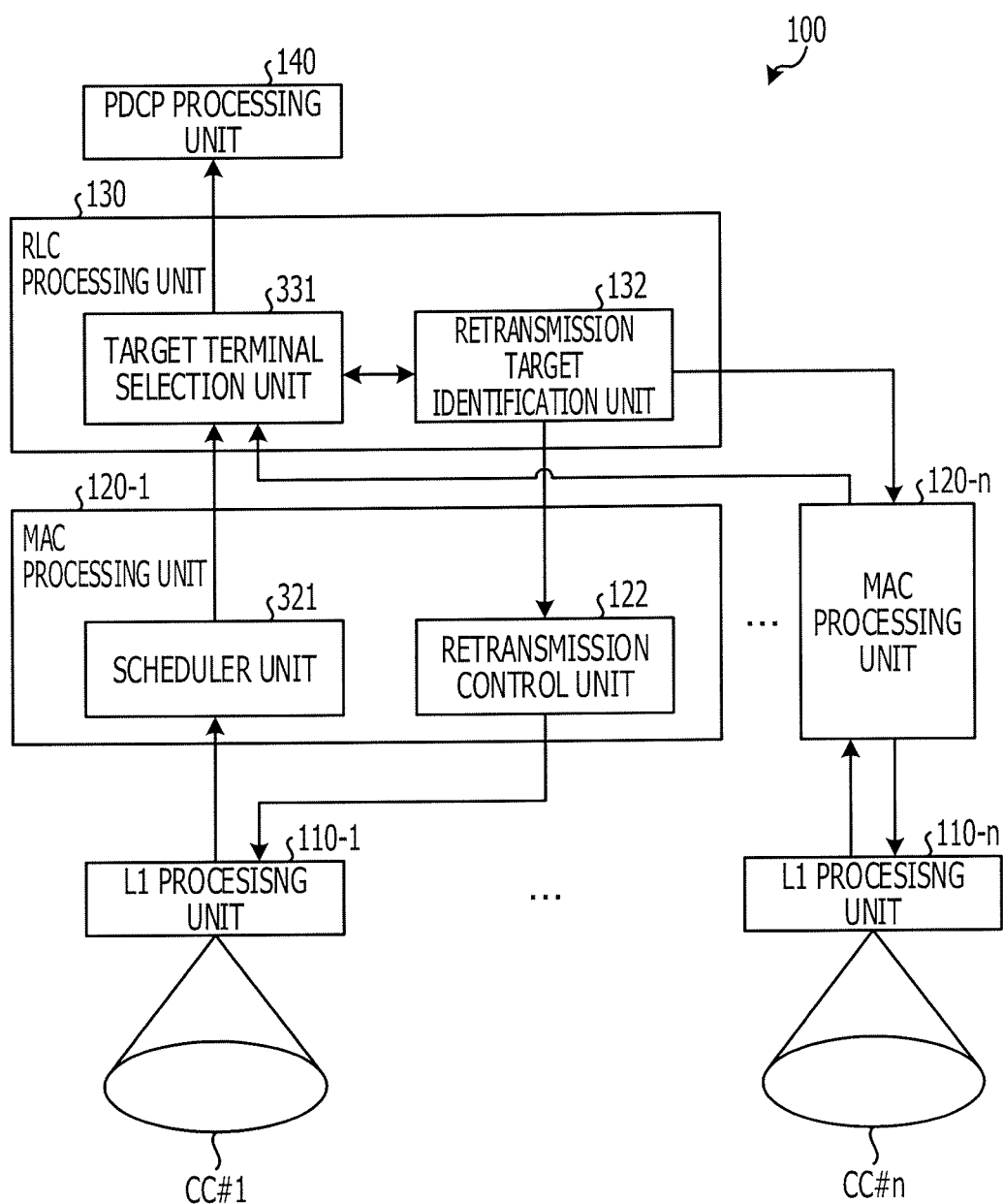
FIG. 11 is a block diagram illustrating the detailed configuration of a base station according to a third embodiment.

FIG. 11 is a block diagram illustrating the detailed configuration of a base station according to the third embodiment. As illustrated in FIG. 11, the base station 100 according to the third embodiment includes a scheduler unit 321 and a target terminal selection unit 331, instead of the scheduler unit 121 and the target terminal selection unit 131 illustrated in FIG. 2.

The scheduler unit 321 in each of the MAC processing units 120-1 to 120-*n* allocates, to each of the CCs, data that is to be transmitted from the communication terminal 200 with a communication quality of the communication terminal 200 that performs transmission of the data. The communication quality is, for example, a signal-to-interference ratio (SIR), the number of transmissions of data, or the like. For example, it is assumed that the communication terminal 200 the identification information of which is "UE#A" and the communication terminal 200 the identification information of which is "UE#B" perform communication with the base station 100 using the CCs #1 to #5. In this case, the scheduler unit 321 allocates, to the CC#1, data of "2000 bytes" that is to be transmitted from the communication terminal 200 the identification information of which is "UE#A", and a communication quality of the communication terminal 200 the identification information of which is "UE#A" by executing the scheduling processing. In addition, for example, the scheduler unit 321 allocates, to the CC#1, data of "1000 bytes" that is to be transmitted from the communication terminal 200 the identification information of which is "UE#B" and a communication quality of the communication terminal 200 the identification information of which is "UE#B" by executing the scheduling processing. In addition, the scheduler unit 321 outputs, as a scheduling result, information that indicates the data and the communication quality that are allocates to each of the plurality of CCs, to the target terminal selection unit 331 in the RLC processing unit 130, which is described later.

When a total amount of the data allocated to the CCs exceeds a predetermined allowable amount, the target terminal selection unit 331 sequentially selects a target terminal in order of communication quality, from the plurality of communication terminals 200 that performs communication with the base station 100 using each of the CCs. For example, the target terminal selection unit 331 accepts an input of a scheduling result from the scheduler unit 321 in each of the MAC processing units 120-1 to 120-n. The target terminal selection unit 331 obtains scheduling information by aggregating the accepted scheduling results, and holds the obtained scheduling information. The target terminal selection unit 331 determines whether or not, based on the scheduling information, the total amount of the data allocated to the CCs exceeds the predetermined allowable amount. The allowable amount is defined beforehand depending on a processing capacity of the RLC processing unit 130. Hereinafter, an allowable amount that has been defined beforehand depending on a processing capacity in the RLC processing unit 130 is referred to as "predetermined allowable amount" as appropriate. In addition, when the total amount of the data allocated to the CCs exceeds the allowable amount, the target terminal selection unit 331 executes the following processing. That is, the target terminal selection unit 331 sequentially selects each of the CCs by the round-robin fashion, and sequentially selects a target terminal in order of communication quality, from the plurality of communication terminals 200 that performs communication with the base station 100 using the selected CC. At that time, the target terminal selection unit 331 successively reports information on the sequentially selected target terminal, to the retransmission target identification unit 132.

When communication qualities of the plurality of communication terminals 200 that performs communication with the base station 100 using the selected CC are same, the target terminal selection unit 331 selects a certain communication terminal from the plurality of communication terminals 200, as a target terminal.

Figure 13:
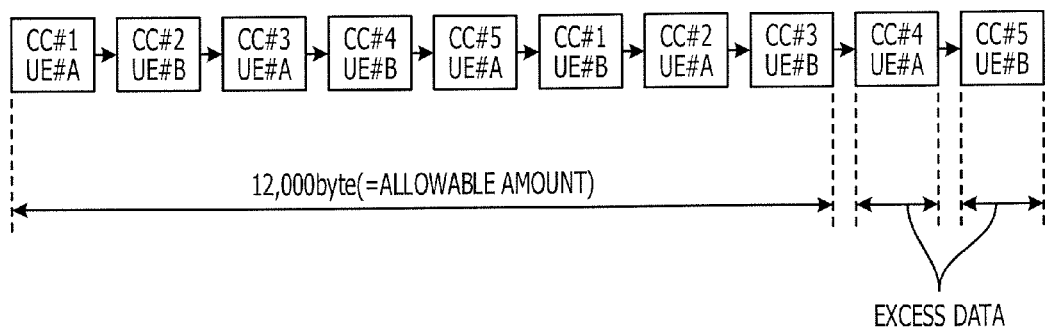
FIG. 13 is a diagram illustrating an example of processing by the target terminal selection unit and a retransmission target identification unit according to the third embodiment.

An example of processing by the target terminal selection unit 331 and the retransmission target identification unit 132 is described below. FIG. 12 is a diagram illustrating an example of scheduling information that is held in the target terminal selection unit according to the third embodiment. FIG. 13 is a diagram illustrating an example of processing by the target terminal selection unit and the retransmission target identification unit according to the third embodiment.

In the scheduling information illustrated in FIG. 12, a communication terminal ID is associated with "TBS/number of transmissions" and the associated communication terminal ID and "TBS/number of transmissions" are stored. The communication terminal ID is identification information that is used to uniquely identify the communication terminal 200 that performs communication with the base station 100 using the plurality of CCs. The "TBS/number of transmissions" is a combination of the size of data that is allocated to each of the plurality of CCs that is used to perform communication with the communication terminal 200 that is identified by the communication terminal ID, and the number of transmissions of data of the communication terminal 200. The number of transmissions of data becomes small as a communication quality of the communication terminal 200 becomes high.

In FIG. 12, the first line indicates that the communication terminal 200 the identification information of which is "UE#A" performs communication with the base station 100 using the CCs #1 to #5, and that data of "2000 bytes" is allocated to each of the CCs #1 to #5. In addition, the first line in FIG. 12 indicates that the number of transmissions in the communication terminal 200 the identification information of which is "UE#A" and that transmits data of "2000 bytes" using the CC#1 is "1". The first line in FIG. 12 indicates that the number of transmissions in the communication terminal 200 the identification information of which is "UE#A" and that transmits data of "2000 bytes" using the CC#2 is "20". The first line in FIG. 12 indicates that the number of transmissions in the communication terminal 200 the identification information of which is "UE#A" and that transmits data of "2000 bytes" using the CC#3 is "11". The first line in FIG. 12 indicates that the number of transmissions in the communication terminal 200 the identification information of which is "UE#A" and that transmits data of "2000 bytes" using the CC#4 is "22". The first line in FIG. 12 indicates that the number of transmissions in the communication terminal 200 the identification information of which is "UE#A" and that transmits data of "2000 bytes" using the CC#5 is "0".

In addition, in FIG. 12, the second line indicates that the communication terminal 200 the identification information of which is "UE#B" performs communication with the base station 100 using the CCs #1 to #5, and data of "1000 bytes" is allocated to each of the CCs #1 to #5. In addition, the second line in FIG. 12 indicates that the number of transmissions in the communication terminal 200 the identification information of which is "UE#B" and that transmits data of "1000 bytes" using the CC#1 is "10". The second line in FIG. 12 indicates that the number of transmissions in the communication terminal 200 the identification information of which is "UE#B" and that transmits data of "1000 bytes" using the CC#2 is "10". The second line in FIG. 12 indicates that the number of transmissions in the communication terminal 200 the identification information of which is "UE#B" and that transmits data of "1000 bytes" using the CC#3 is "12". The second line in FIG. 12 indicates that the number of transmissions in the communication terminal 200 the identification information of which is "UE#B" and that transmits data of "1000 bytes" using the CC#4 is "11". The second line in FIG. 12 indicates that the number of transmissions in the communication terminal 200 the identification information of which is "UE#B" and that transmits data of "1000 bytes" using the CC#5 is "1".

The target terminal selection unit 331 accepts an input of a scheduling result from the scheduler unit 321 in each of the MAC processing units 120-1 to 120-n. The target terminal selection unit 331 obtains the scheduling information illustrated in FIG. 12 by aggregating the accepted scheduling results, and holds the obtained scheduling information. The target terminal selection unit 331 determines, based on the scheduling information, whether or not a total amount of data allocated to the CCs #1 to #5 exceeds a predetermined allowable amount. Here, it is assumed that the allowable amount is 12,000 bytes. The target terminal selection unit 331 executes the following processing because the total amount of the data allocated to the CCs #1 to #5 (15,000 bytes) exceeds the allowable amount (12,000 bytes). That is, the target terminal selection unit 331 sequentially selects each of the CCs #1 to #5 by the round-robin fashion, and sequentially selects a target terminal from the plurality of communication terminals 200 that performs communication using the selected CC, in order of communication quality, that is, in order of the small number of transmissions.

For example, as illustrated in FIG. 13, the target terminal selection unit 331 sequentially selects each of the CCs #1 to #5 in order of the CC#1, the CC#2, the CC#3, the CC#4, the CC#5, the CC#1, the CC#2, to the CC#3. The target terminal selection unit 331 selects, as a target terminal, the communication terminal 200 the identification information of which is "UE#A" and that has the most smallest number of transmissions, from the communication terminal 200 the identification information of which is "UE#A" and the communication terminal 200 the identification information of which is "UE#B" that perform communication using the selected CC#1. Then, the target terminal selection unit 331 selects, as a target terminal, the communication terminal 200 the identification information of which is "UE#B" and that has the smallest number of transmissions, from the communication terminal 200 the identification information of which is "UE#A" and the communication terminal 200 the identification information of which is "UE#B" that perform communication using the CC#2. Then, the target terminal selection unit 331 selects, as a target terminal, the communication terminal 200 the identification information of which is "UE#A" and that has the smallest number of transmissions, from the communication terminal 200 the identification information of which is "UE#A" and the communication terminal 200 the identification information of which is "UE#B" that perform communication using the CC#3. Then, the target terminal selection unit 331 selects, as a target terminal, the communication terminal 200 the identification information of which is "UE#B" and that has the smallest number of transmissions, from the communication terminal 200 the identification information of which is "UE#A" and the communication terminal 200 the identification information of which is "UE#B" that perform communication using the CC#4. Then, the target terminal selection unit 331 selects, as a target terminal, the communication terminal 200 the identification information of which is "UE#A" and that has the smallest number of transmissions, from the communication terminal 200 the identification information of which is "UE#A" and the communication terminal 200 the identification information of which is "UE#B" that perform communication using the CC#5. In addition, the target terminal selection unit 331 selects, as a target terminal, the communication terminal 200 the identification information of which is "UE#B" and that has the second smallest number of transmissions, from the communication terminal 200 the identification information of which is "UE#A" and the communication terminal 200 the identification information of which is "UE#B" that perform communication using the CC#1. In addition, the target terminal selection unit 331 selects, as a target terminal, the communication terminal 200 the identification information of which is "UE#A" and that has the second smallest number of transmissions, from the communication terminal 200 the identification information of which is "UE#A" and the communication terminal 200 the identification information of which is "UE#B" that perform communication using the CC#2. In addition, the target terminal selection unit 331 selects, as a target terminal, the communication terminal 200 the identification information of which is "UE#B" and that has the second smallest number of transmissions, from the communication terminal 200 the identification information of which is "UE#A" and the communication terminal 200 the identification information of which is "UE#B" that perform communication using the CC#3.

The retransmission target identification unit 132 successively accepts an input of information on the target terminal that has been sequentially selected by the target terminal selection unit 331. The retransmission target identification unit 132 monitors whether or not a total amount of the data allocated to the communication terminals 200 that have been selected as the target terminals reaches the allowable amount (12,000 bytes), with reference to the scheduling information illustrated in FIG. 12. The retransmission target identification unit 132 executes the following processing because the total amount of the data allocated to the communication terminals 200 that have been selected as the target terminals reaches the allowable amount (12,000 bytes) when the communication terminal 200 the identification information of which is "UE#B" and that performs communication using the CC#3 is selected. That is, as illustrated in FIG. 13, the retransmission target identification unit 132 identifies, as a communication terminal that performs transmission of the excess data, the communication terminal 200 the identification information of which is "UE#A", that performs communication using the CC#4, and that is not selected by the target terminal selection unit 331 yet. In addition, the retransmission target identification unit 132 identifies the communication terminal 200 the identification information of which is "UE#B" and that performs communication using the CC#5, as a communication terminal that performs transmission of the excess data. The retransmission target identification unit 132 notifies the retransmission control units 122 in the MAC processing units 120-1 to 120-*n* of the identified communication terminal 200, as a retransmission target.

As described above, when a target terminal is selected based on each of the CCs by the round-robin fashion, the target terminal selection unit 331 and the retransmission target identification unit 132 select the target terminal in order of communication quality. As a result, a communication terminal that is a reception target of data is selected in order of communication quality, the communication terminal 200 that performs transmission of excess data of the base station 100 may be identified easily.

Figure 14:
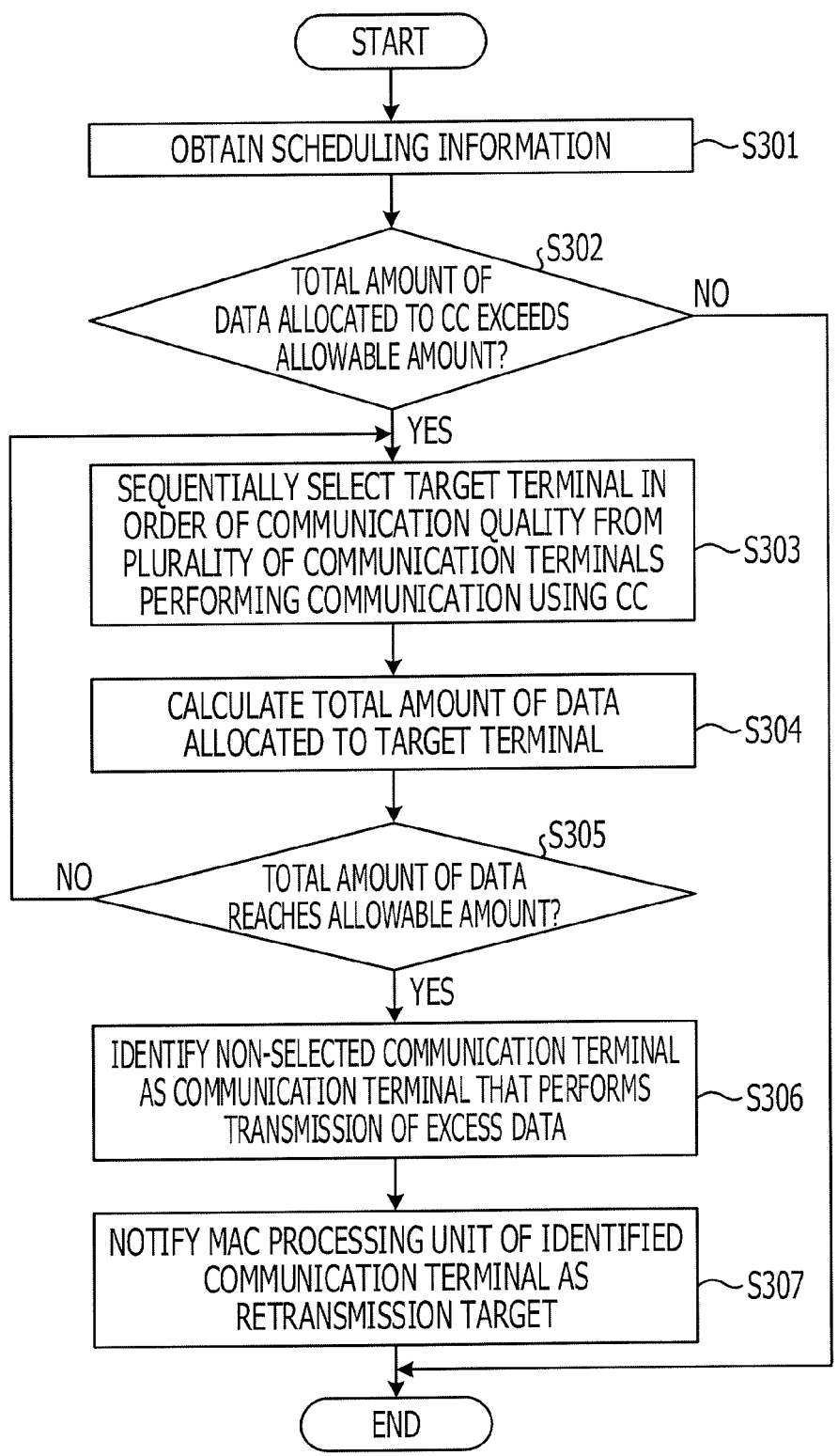
FIG. 14 is a flowchart illustrating a processing procedure by an RLC processing unit according to the third embodiment.

A processing procedure of the retransmission control method in the base station 100 according to the embodiment is described below. FIG. 14 is a flowchart illustrating a processing procedure by the RLC processing unit according to the third embodiment. A processing procedure by the MAC processing unit according to the third embodiment is similar to the processing procedure illustrated in FIG. 6, and the description is omitted herein.

As illustrated in FIG. 14, the target terminal selection unit 331 in the RLC processing unit 130 obtains scheduling information by aggregating the scheduling results that have been accepted from the scheduler units 321 in the MAC processing units 120-1 to 120-*n* (Step S301). The target terminal selection unit 331 holds the obtained scheduling information.

The target terminal selection unit 331 determines, based on the scheduling information, whether or not a total amount of data allocated to the CCs exceeds an allowable amount (Step S302). When the total amount of the data allocated to the CCs is equal to the allowable amount or less (No in Step S302), the target terminal selection unit 331 aggregates the data that are transferred from the MAC processing units 120-1 to 120-n, transfers the aggregated data to the PDCP processing unit 140, and ends the processing.

In addition, when the total amount of the data allocated to the CCs exceeds the allowable amount (Yes in Step S302), the target terminal selection unit 331 sequentially selects a target terminal in order of communication quality, from the plurality of communication terminals 200 that performs communication using each of the CCs (Step S303). At that time, the target terminal selection unit 331 successively reports information on the sequentially selected target terminal, to the retransmission target identification unit 132.

The retransmission target identification unit 132 successively accepts an input of the information on the target terminal that has been sequentially selected by the target terminal selection unit 331. The retransmission target identification unit 132 calculates a total amount of the data allocated to the communication terminals 200 that have been selected as the target terminals, with reference to the scheduling information that is held in the target terminal selection unit 331 (Step S304).

The retransmission target identification unit 132 monitors whether or not the calculated total amount of the data reaches the allowable amount (Step S305). When the calculated total amount of the data is less than the allowable amount (No in Step S305), the retransmission target identification unit 132 returns the processing to Step S303.

In addition, when the calculated total amount of the data reaches the allowable amount (Yes in Step S305), the retransmission target identification unit 132 identifies the communication terminal 200 that is not selected by the target terminal selection unit 331 yet, as a communication terminal that performs transmission of the excess data (Step S306). The retransmission target identification unit 132 notifies the retransmission control units 122 in the MAC processing units 120-1 to 120-n of the identified communication terminal 200, as a retransmission target (Step S307).

As described above, the base station 100 according to the third embodiment sequentially selects a target terminal in order of communication quality, from the plurality of communication terminals 200 that performs communication with the base station 100 using each of the CCs. In addition, when a total amount of the data allocated to the sequentially selected target terminals reaches the allowable amount, the base station 100 identifies the communication terminal 200 that is not selected yet, as a communication terminal that performs transmission of the excess data.

Therefore, when a target terminal is selected based on each of the CCs by the round-robin fashion, the base station 100 according to the third embodiment may select the target terminal in order of communication quality. Thus, the communication terminal that is a reception target of data is selected in order of communication quality, and the communication terminal 200 that performs transmission of excess data that has of the base station 100 may be identified easily. As a result, loss of data having a high communication quality from among data at the time of communication using the plurality of CCs may be reduced on a priority basis.

Fourth Embodiment

The embodiments of the radio communication device and the retransmission control method discussed herein are described above, and the radio communication device and the retransmission control method may be discussed in a further embodiment in addition to the above-described embodiments. Therefore, the further embodiment is described herein.

In the above-described first embodiment, the example is described in which the base station selects, as a target terminal, a certain communication terminal based on each of the CCs by the round-robin fashion. However, when the base station selects the target terminal based on each of the CCs by the round-robin fashion, the base station may select the target terminal in order from large to small total amount of the data allocated to the CCs. In addition, when the base station selects the target terminal based on each of the CCs by the round-robin fashion, the base station may select the target terminal in order from small to large total amount of the data allocated to the CCs.

(Hardware Configuration)

Figure 15:
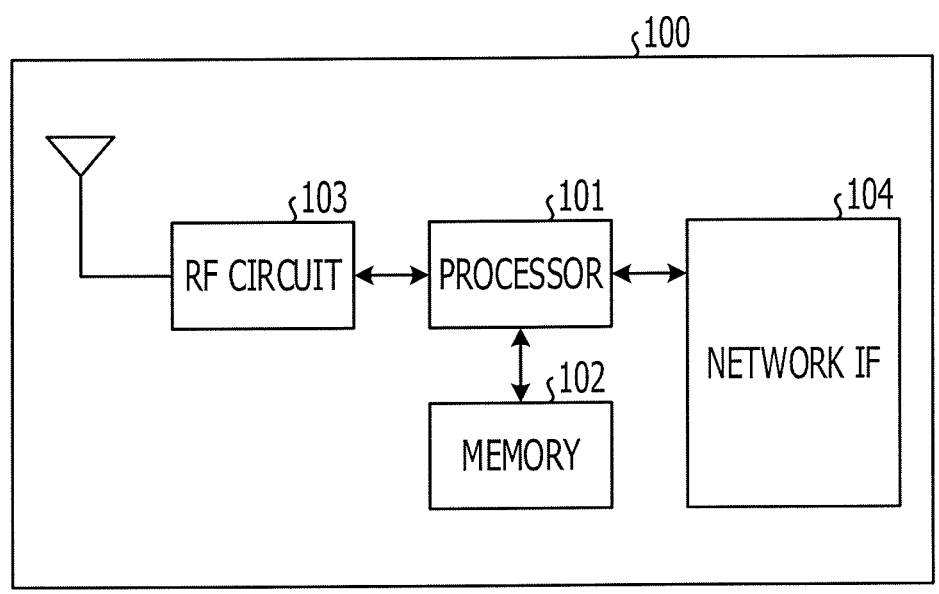
FIG. 15 is a diagram illustrating a hardware configuration example of the base station.

The base station 100 according to each of the above-described embodiments may be obtained by the following hardware configuration. FIG. 15 is a diagram illustrating a hardware configuration example of the base station.

As illustrated in FIG. 15, as hardware configuration elements, the base station 100 includes a processor 101, a memory 102, a radio frequency (RF) circuit 103, and a network interface (IF) 104. The RF circuit 103 includes an antenna. The processor 101 is, for example, a digital signal processor (DSP), a central processing unit (CPU), or the like. The memory 102 may be constituted, for example, by a random access memory (RAM), a read only memory (ROM), a flash memory, and the like. Each of the MAC processing units 120-1 to 120-n, the RLC processing unit 130, and the PDCP processing unit 140 is obtained, for example, by an integrated circuit such as the processor 101. Each of the L1 processing units 110-1 to 110-n is obtained, for example, by the RF circuit 103.

In addition, the various processing described in the above-described embodiments may be achieved by causing a computer to execute a program that has been prepared beforehand. That is, a program that corresponds to the processing that is executed by each of the MAC processing units 120-1 to 120-n, the RLC processing unit 130, and the PDCP processing unit 140 may be recorded to the memory 102, read into the DSP 101, and function as a process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication device comprising:
 a memory;
 a processor coupled to the memory and configured to:
 allocate data to be transmitted from a communication terminal, to a plurality of radio carriers for communication with the communication terminal;
 identify, when a total amount of the data allocated to the radio carriers exceeds a certain amount, a communication terminal that performs transmission of excess data, which corresponds to the difference between the total amount and the certain amount, using the radio carrier to which the excess data is allocated; and a radio communication device configured to transmit a repeat request to the identified communication terminal that the excess data is transmitted to the radio communication device again.

2. The radio communication device according to claim 1 wherein the processor is further configured to
sequentially select a target terminal that is a target of a communication terminal that is to receive data, from the plurality of communication terminals that performs communication with the radio communication device, using each of the radio carriers when the total amount of the data allocated to the radio carriers exceeds the certain amount, wherein
identify, as a communication terminal that performs transmission of the excess data, a communication terminal that is not selected, from the plurality of communication terminals when a total amount of data allocated to the target terminals that are sequentially selected reaches the certain amount.

3. The radio communication device according to claim 2, wherein the processor is further configured to
allocate, to each of the radio carriers, the data and a priority level of a communication terminals that performs transmission of the data
sequentially select the target terminal in order of the priority level from the plurality of communication terminals when the total amount of the data allocated to the radio carriers exceeds the certain amount, and
identify, as a communication terminal that performs transmission of the excess data, a communication terminal that is not selected, from the plurality of communication terminals when the total amount of the data allocated to the target terminals that are sequentially selected reaches the certain amount.

4. The radio communication device according to claim 2, wherein the processor is further configured to
allocate, to each of the radio carriers, the data and a communication quality of a communication terminal that performs transmission of the data
sequentially select the target terminal in order of the communication quality from the plurality of communication terminals when the total amount of the data allocated to the radio carriers exceeds the certain amount, and
identify, as a communication terminal that performs transmission of the excess data, a communication terminal that is not selected, from the plurality of communication terminals when the total amount of the data allocated to the target terminals that are sequentially selected reaches the certain amount.

5. The radio communication device according to claim 1, further comprising a communication protocol that includes a first layer and a second layer in which data that are transferred from the first layer are aggregated and output of the data is performed,
wherein the processor is further configured to
allocate the data to the radio carriers with the first layer,
identify a communication terminal that performs transmission of the excess data with the first layer, and
transmit the repeat request to the communication terminal that is identified with the first layer, and terminate transfer of the data from the first layer to the second layer.

6. A retransmission control method that is executed by a radio communication device, the retransmission control method comprising:
allocating data to be transmitted from a communication terminal, to a plurality of radio carriers that are used to perform communication with the communication terminal;
identifying, when a total amount of the data allocated to the radio carriers exceeds a certain amount, a communication terminal that performs transmission of excess data, which corresponds to the difference between the total amount and the certain amount, using the radio carrier to which the excess data is allocated; and
transmitting a repeat request to the identified communication terminal so that the excess data is transmitted to the radio communication device again.

* * * * *